United States Patent
Hubbs

(12) 
(10) Patent No.: US 7,014,325 B2
(45) Date of Patent: Mar. 21, 2006

(54) DISPLACEMENT PROCESS FOR HOLLOW SURVEYING RETROREFLECTOR

(75) Inventor: William O. Hubbs, Cedar Hill, MO (US)

(73) Assignee: Hubbs Machine & Manufacturing Inc., Cedar Hill, MO (US)

( * ) Notice: Subject to any disclaimer, the term of this patent is extended or adjusted under 35 U.S.C. 154(b) by 0 days.

(21) Appl. No.: 10/766,454

(22) Filed: Jan. 28, 2004

(65) Prior Publication Data

US 2004/0212886 A1    Oct. 28, 2004

Related U.S. Application Data

(60) Provisional application No. 60/443,268, filed on Jan. 30, 2003.

(51) Int. Cl.
G02B 5/12    (2006.01)

(52) U.S. Cl. .................................................. 359/515
(58) Field of Classification Search ............... 359/515, 359/516, 529, 530
See application file for complete search history.

(56) References Cited

U.S. PATENT DOCUMENTS

| | | |
|---|---|---|
| 3,712,706 A | 1/1973 | Stamm |
| 3,924,201 A | 12/1975 | Crow |
| 4,090,790 A | 5/1978 | Dragon et al. |
| 4,695,047 A | 9/1987 | Ehrhardt et al. |
| 4,701,010 A | 10/1987 | Roberts |
| 4,717,251 A | 1/1988 | Wells et al. |
| 4,730,141 A | 3/1988 | Tosswill |
| 4,733,236 A | 3/1988 | Matosian |
| 4,752,688 A | 6/1988 | Tosswill |
| 4,832,325 A | 5/1989 | Okolischan et al. |
| 4,834,358 A | 5/1989 | Okolischan et al. |
| 4,954,005 A | 9/1990 | Knasel et al. |
| 5,024,514 A | 6/1991 | Bleier et al. |
| 5,122,901 A | 6/1992 | Bleier |
| 5,218,770 A | 6/1993 | Toga |
| 5,235,605 A | 8/1993 | Rines et al. |
| 5,235,610 A | 8/1993 | Finch et al. |
| 5,326,962 A | 7/1994 | Peng |
| 5,408,352 A | 4/1995 | Peng |
| 5,526,167 A | 6/1996 | Peng |
| 5,555,125 A | 9/1996 | Peng |
| 5,583,683 A | 12/1996 | Scobey |
| 5,610,719 A | 3/1997 | Allen et al. |
| 5,663,550 A | 9/1997 | Peng |
| 5,851,740 A | 12/1998 | Sawyer |
| 6,155,689 A * | 12/2000 | Smith ..................... 359/530 |

* cited by examiner

Primary Examiner—Euncha P. Cherry
(74) Attorney, Agent, or Firm—Paul M Denk

(57) ABSTRACT

A one-piece hollow retroreflector is formed in a cylindrical body of lead or another malleable material in a punch press operation. A punch having a cube corner configuration is used to form a reflecting chamber having three mutually orthogonal surfaces into the cylinder. The reflecting chamber can be formed using a rough punch, and then a finish punch. The finish punch would produce the reflective surfaces of the three walls of the chamber. The chamber walls can be coated with a protective coating to help prevent corrosion of the surfaces. After the reflecting chamber has been formed and finished, the body of the retroreflector can be machined to remove the displaced material and otherwise form the outer surfaces of the body to a desired shape.

6 Claims, 2 Drawing Sheets

DISPLACEMENT PROCESS FOR HOLLOW SURVEYING RETROREFLECTOR

CROSS-REFERENCE TO RELATED APPLICATIONS

This regular letters patent application claims priority to provisional patent application having Ser. No. 60/443,268, which was filed on Jan. 30, 2003.

BACKGROUND OF THE INVENTION

This invention relates to retroreflectors, and more particularly to hollow retroreflectors used with surveying equipment.

Surveying equipment currently use light rays (i.e., lasers) to perform the measuring and calculating functions required when surveying. Surveying retroreflectors are used to receive an incident light ray and reflect that ray along a parallel path back to its source. Some surveying equipment detects the return of the light ray and, from the elapsed time, determine the distance between the source and the retroreflector. Because the light ray is reflected back to its source, the retroreflector must be made very accurately and to very close tolerances.

Some surveying equipment use hollow retroreflectors. One example of a hollow retroreflector is shown in U.S. Pat. No. 5,122,901, which is owned by PLX, Inc. and sold under the name "Omni-Wave". The hollow retroreflector shown in this patent uses three reflecting panels which are set in a receptacle. The receptacle is then received in an outer casing. The reflecting panels are made of glass and have a reflective coating applied thereto. Because of the precision that is required, the three glass panels must be very accurately set in the receptacle. The precision and accuracy required of the hollow retroreflector makes this retroreflector very expensive and time consuming to produce. Further, because glass is used, it is fragile.

Opticon, of Billerica, produces another hollow retroreflector which uses an aluminum substrate rather than a glass substrate. The Opticon retroreflector uses a male master coated with a releasing agent and a reflective coating. A bonding agent is applied to the coating on the master, or on the surfaces of the part to which the reflective coating is to be applied. The master and the part are then brought together to bond the reflective coating to the aluminum substrate. This hollow retroreflector is also very expensive and time consuming to produce. Additionally, the reflective coating may not transfer well, leaving voids or finishes which are unacceptable.

BRIEF SUMMARY OF THE INVENTION

A one-piece hollow retroreflector is formed in a cylindrical body, or other shape, in a punch press operation. A punch having a cube corner configuration is used to punch a reflecting chamber having three mutually orthogonal surfaces into the cylinder. The chamber walls might be coated with a clear preservative to prevent corrosion of the surfaces. The retroreflector is formed from a malleable and reflective material. After the reflecting chamber has been formed and finished, the body of the retroreflector can be machined to remove the displaced material and otherwise form the outer surfaces of the body to a desired shape.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

Figure 1:
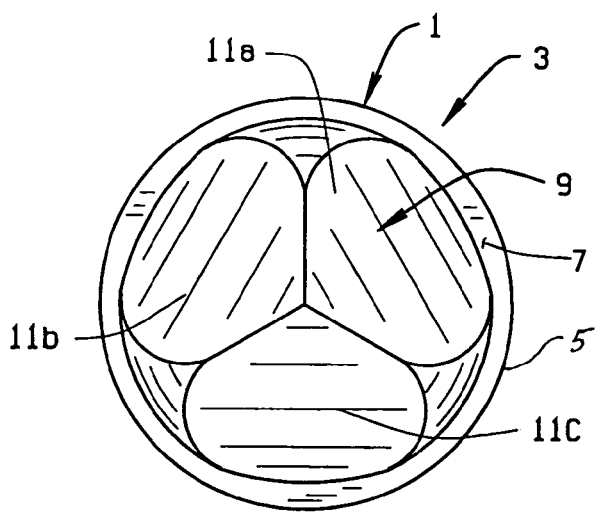
FIG. 1 is a top plan view of a hollow retroreflector of the present invention.

A hollow retroreflector 1 of the present invention is shown in FIG. 1. The retroreflector 1 is made from a solid piece of malleable material and hence is a one-piece retroreflector. The malleable material can be of a material that provides a highly reflective surface, such as lead, or other highly reflective metals. The retroreflector 1 has a body 3 which is preferably cylindrical, and hence has a circular side wall 5 and flat top and bottom surfaces 7. A reflective chamber 9 is formed in the top surface of the body 3. The chamber 9 has three walls 11a, b, c which are mutually orthogonal to each other and define a corner of a cube. That is, the junctions between walls 11a and 11b, between 11b and 11c, and between 11c and 11a are all 90°. The corners are all as sharp as possible, so as not to create a radius at the corners or apex.

Figure 2:
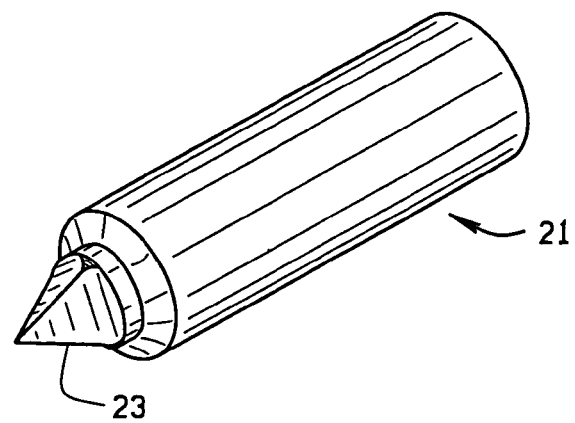
FIG. 2 is a perspective view of a punch used to produce the hollow retroreflector.
Figure 4:
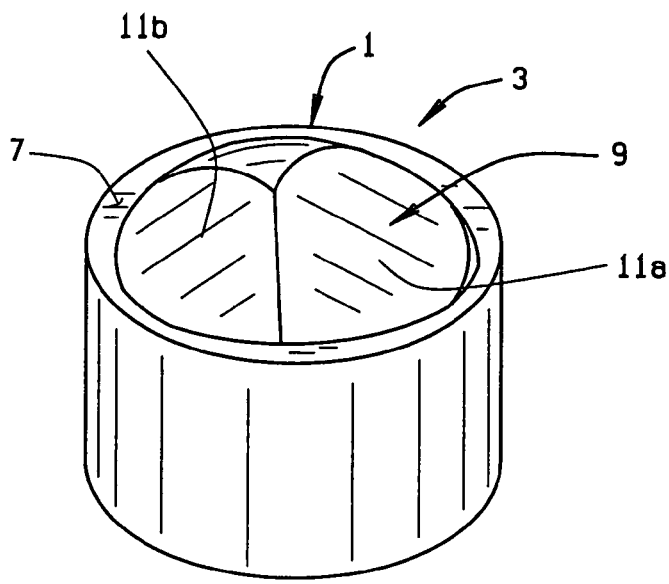
FIG. 4 is an isometric view of the hollow retroreflector of the present invention.
Figure 3:
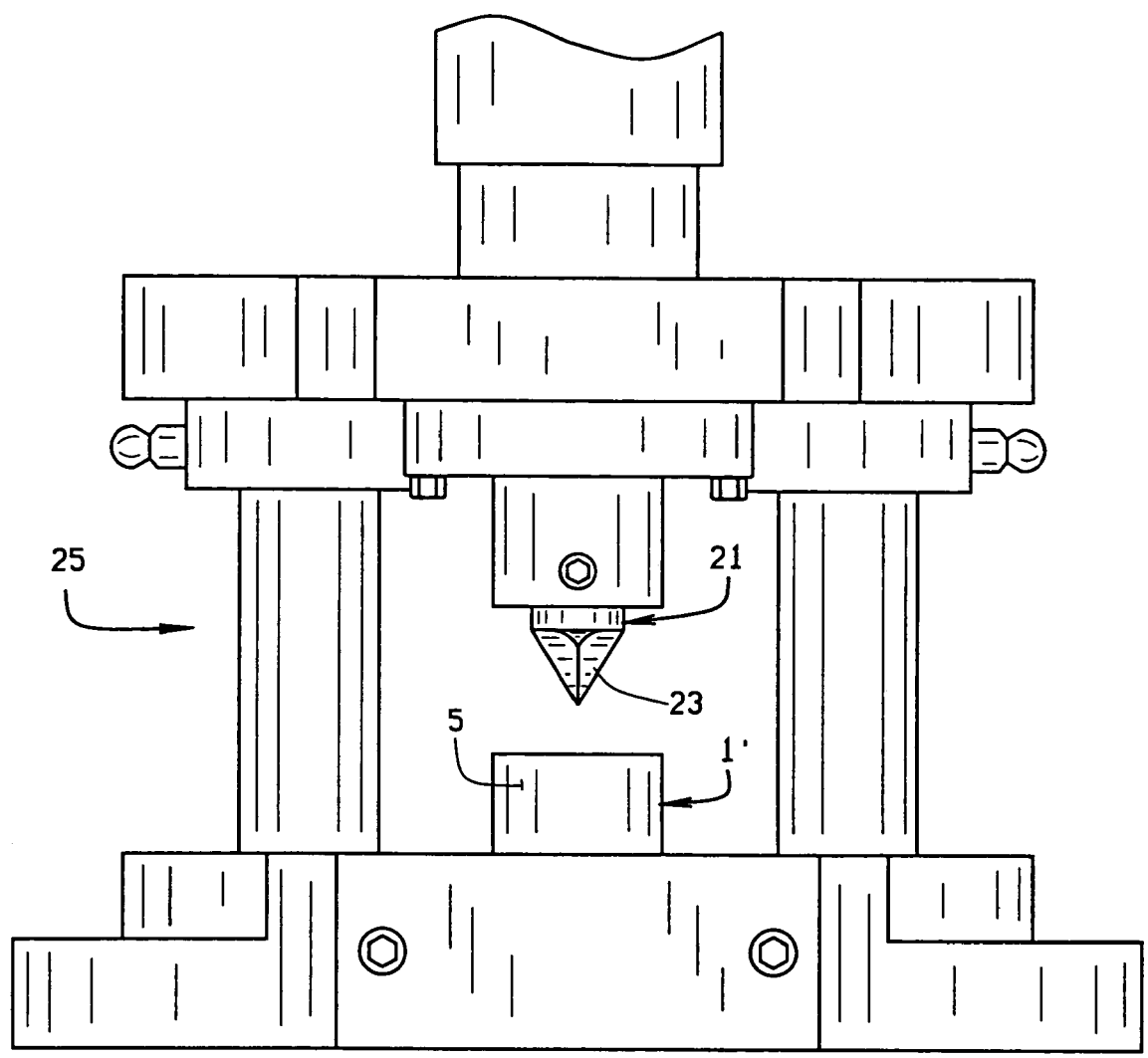
FIG. 3 is an elevational view of a punch press in which a retroreflector blank and the punch are mounted to produce the hollow retroreflector.

The chamber 9 is formed in a blank cylinder using a forming punch 21 in a method similar to a punch press-type operation. The punch 21 is shown in FIG. 2 has an end or tip 23 of the desired shape and size. As can be appreciated, the punch tip 23 forms a corner of a cube. The punch 21 and a blank 1' are placed in a press 25, as seen in FIG. 3. The blank 1' is mounted on a base of the press 25 and the punch 21 is mounted in a movable jig of the press. The punch 21 is pressed down and material is displaced from the blank 1' to form the reflective chamber 9. Once the chamber 9 is formed, the excess or displaced material can be machined away to give the required outside finish size or shape to the reflector body 3.

The chamber 9 can be formed in a single pressing operation, but may require a rough punching operation and then a finish punching operation. The finish punch and rough punch would essentially be the same size and shape. However, the finish punch would be made of a material that will produce a reflective finish on the walls of the chamber 9. The finish punch can be made from hardened steel.

Once the chamber 9 has been formed, a clear protective coating may be applied to the surface of the walls 11a–c to prevent corrosion of the metal body 3.

The hollow retroreflector has several advantages over the prior known retroreflectors. It is made as a one-piece member made in a punching operation and requires no assembly. Hence, it is less expensive to manufacture. Further because it is one piece member, it is more resistant to damage, and because it has no glass, it is not breakable. Again, because there is no assembly, there will be a lower rejection rate—the only variable would be the ware or damage imposed on the finish punch. The internal shape of the chamber 9 can be easily altered by simply producing new punches.

As various changes could be made in the above constructions without departing from the scope of the invention, it is intended that all matter contained in the above description or shown in the accompanying drawings shall be interpreted as illustrative and not in a limiting sense.

I claim:

1. A device for reflecting incident light on a parallel return path, comprising:
   a body, having a round cylindrical shape including one or more sidewalls, a top surface and a bottom surface, said sidewall joins the perimeters of said top surface and said bottom surfaces, and said body being made of lead; and,
   a chamber punched into said top surface having a round shape on the plane of said top surface, three or more polished reflective mutually orthogonal walls depressed into said body, said walls reflecting light entering said chamber parallel to the incident direction of the light, and said sidewall stabilizing and protecting said walls within said chamber.

2. The device for reflecting incident light of claim 1 wherein said chamber is formed by three triangulated and interconnected surfaces, which converge to a point at the inward most depth within the body of said chamber.

3. A method of forming a reflector in a highly reflective malleable material comprising the steps of:
   1) placing a blank of the material in a base of a press,
   2) securing a punch in the jig of a press, said punch having a tip with three faces shaped like the corner of a cube with said corner at the point of the tip,
   3) advancing said punch into said blank to form a chamber having highly reflective surfaces,
   4) finishing said blank to remove excess material from the punching operation, and
   5) coating said chamber with transparent material that forms a layer upon said surfaces.

4. The method of forming a reflector in claim 3 wherein step 2 and step 3 are repeated for a rough punch and a finish punch and said rough punch and said finish punch have the same shape and size.

5. The method of claim 3 further comprising selecting the blank of material as lead.

6. A device for reflecting incident light on a parallel return path, comprising:
   a body, having a round cylindrical shape including one or more sidewalls, a top surface and a bottom surface, said sidewall joins the perimeters of said top surface and said bottom surfaces, and said body being made of lead; and,
   a chamber punched into said top surface having a round shape on the plane of said top surface, four or more polished reflective walls depressed into said body forming a point of intersection, said walls reflecting light entering said chamber parallel to the incident direction of the light, and said sidewall stabilizing and protecting said walls within said chamber.

* * * * *